_United States Patent Office_

3,642,646
Patented Feb. 15, 1972

3,642,646
CARBOXY-BEARING ADDUCT POLYOL COMPOSITION CONTAINING TETRABROMOPHTHALIC ANHYDRIDE
Sheldon H. Marcus, Skokie, Ill., assignor to Standard Oil Company, Chicago, Ill.
No Drawing. Filed Apr. 23, 1968, Ser. No. 723,594
Int. Cl. C09k *3/28;* C08g *51/00*
U.S. Cl. 252—182                       5 Claims

ABSTRACT OF THE DISCLOSURE

Polyol compositions useful in preparing rigid foam compositions are disclosed. These polyols comprise the reaction adducts of polyfunctional aromatic carboxylic acid anhydrides and polyether polyols. Adduct polyols which additionally contain a polyethyleneglycol are also disclosed.

---

My invention relates to foamable polyurethane and modified polyurethane resin compositions. Foam compositions of this type are known in the art to be useful as, for example, insulating materials, flotation materials and structural reinforcement materials.

Foamable polyurethane-type resin compositions may be described basically as the reaction products of polyisocyanates and polyhydric alcohols. Modified polyurethane-type resins may additionally include a third principal component such as an aromatic carboxylic acid derivative. Modified polyurethane foams of this type are more fully described in Belgian Pat. 674,252.

Foamed resin compositions are prepared from the components simply by mixing the polyol and the polyisocyanate. The addition of water or a low boiling fluorocarbon as a blowing agent is a common expedient to obtain better foaming action. Other components, such as siloxane glycol copolymer surfactants, which improve cell configuration, or catalysts such as organo-tins, may be added to the reaction mixture prior to foaming. Addition of heat or pressure is necessary to achieve foaming for the so-called "hot foam" compositions, but "cold foam" compositions may be conveniently foamed at ambient temperature and pressure.

Foam compositions prepared according to the manner described frequently do not provide the degree of fire retardance, smoke suppression, and self-extinguishment which is required of a satisfactory insulating or building material. To achieve foams which have satisfactory properties of this nature, it is often necessary to add a flame retarding agent to the foam composition. Such agents may be, for example, inert solids such as antimony trioxide or liquids such as organo-phosphorous derivatives. While the use of such fire-retardants has, in general, advantageous effects on the fire-resistant properties of a foam composition, it is not a completely satisfactory method of increasing fire resistance. For example, such agents increase the storage and handling problems connected with foamed resin compositions. Another disadvantage of these agents is that they may result in a foam composition which has nonuniform fire-resistant properties because of uneven distribution of the agents throughout the foam. An additional disadvantage for some of the more sophisticated fire retardant agents is, of course, cost.

I have discovered a way to prepare foam compositions for satisfactory flame resistance, smoke suppression, and self-extinguishing properties without the use of flame retardant additives. In particular, my invention permits the preparation of foam compositions such that the disadvantages of foams containing flame retardant additives are obviated, while achieving equal or superior flame resistant and self-extinguishing properties, and while achieving considerably improved smoke suppression characteristics. My invention may, however, be used together with conventional flame retarding agents resulting in foam compositions having superior properties to those now known to the art.

Specifically, my invention relates to improved polyol compositions which, when reacted with a polyisocyanate, produce a foam composition having the characteristics described above. My polyol composition may be characterized as a carboxy-bearing adduct polyol. More specifically, my composition is the reaction adduct of a polyol and the anhydride of a polyfunctional aromatic carboxylic acid or chlorendic anhydride. The aromatic acid anhydrides useful in preparing my polyol composition may additionally contain, for example, halogen substituents. Examples of suitable aromatic acid anhydrides are: phthalic anhydride, tetrachlorophthalic anhydride, tetrabromophthalic anhydride and trimellitic anhydride.

The polyols suitable for the preparation of my adduct composition include, generally, polyether polyols and mixtures of polyether polyols and poly(ethyleneglycol). Such suitable polyols include, for example, the poly(oxypropylene) adducts of pentaerythritol, sucrose, soribitol, alphamethylglucoside, trimethylolpropane, and the like. These polyether polyols may conveniently be blended, in order to maintain a workable viscosity, with diethylene glycol, triethylene glycol, tetraethylene glycol, or a poly(ethyleneglycol) having a molecular weight in the range of from about 200 to about 500. A particularly preferred glycol is a poly(ethyleneglycol) having an average molecular weight of about 200. When polyol/glycol blends are employed, it is advantageous that the blend comprise from about 90 to about 10 weight percent of the glycol and from about 10 to about 90 weight percent of the polyether polyol. In general, a blend of from about 80 to about 20 weight percent of the glycol and from about 20 to about 80 weight percent of the polyether polyol is satisfactory. A particularly preferred composition of the blend is from about 75 to about 35 weight percent of the glycol and from about 25 to about 65 weight percent of the polyether polyol.

To form the adduct composition of my invention, the anhydride and the polyol or polyol blend constituents should be combined in proportions such that from about 5 to about 40 weight percent of the adduct composition comprises the anhydride constituent, and from about 95 to about 60 weight percent of the adduct composition comprises the polyol or polyol blend constituent. A preferred adduct composition comprises from about 30 to about 35 weight percent anhydride and from about 70 to about 65 weight percent polyol or polyol blend. Examples of preferred adduct compositions of my invention include: An adduct comprising a propoxylated sucrose polyol, a polyethyleneglycol having an average molecular weight of about 200, and tetrabromophthalic anhydride in the weight ratio of 3:7:5; an adduct comprising a propoxylated pentaerythritol polyol and tetrachlorophthalic anhydride in the weight ratio 10:5; an adduct comprising an alphamethylglucoside based polyol, a polyethyleneglycol having an average molecular weight of about 200, and tetrabromophthalic anhydride in the weight ratio 5:5:5; an adduct comprising a propoxylated sucrose polyol, a polyethyleneglycol having an average molecular weight of about 200, and trimellitic anhydride in the weight ratio 3:7:5; an adduct comprising a propoxylated pentaerythritol polyol and tetrabromophthalic anhydride in the weight ratio 2:1; and an adduct comprising a sucrose polyol, tetraethyleneglycol and tetrabromophthalic anhydride in the weight ratio 6:4:5.

The adduct polyol composition whtich I have invented is prepared by heating a slurry of the polyol or polyol blend and the anhydride at a temperature below about 350° F. until sign of reaction is observed. A reaction temperature below about 250° F. is preferred to avoid polyesterification. The mechanism by which my adduct is formed is a simple addition of a hydroxy function from the polyol across the anhydride ring resulting in an ester and a free carboxy group. It is critical that the temperature of the adduct reaction is below that at which the free carboxy group will combine with a free hydroxy group to form a second ester function on the aromatic nucleus.

The adduction reaction is conveniently carried out by combining the anhydride and polyol constituents in a vessel equipped with a stirring means, a thermometer, temperature control means, and nitrogen blanketing means. Preferably, the reaction is carried out in the presence of a basic catalyst such as triethylamine. From about 0.05 to about 2.0 weight percent of the catalyst is a suitable amount. Neither the catalyst nor the nitrogen blanketing is necessary to the preparation of the adduct, but both are included in the preferred method of preparation.

The reaction mixture is heated until sign of reaction occurs. Depending upon the particular constituents, such sign of reaction may appear somewhere in the range of 150 to 300° F. Usually, however, sign of reaction is observed around 180 to 220° F. When sign of reaction is observed additional heating is discontinued and the mixture is maintained at the reaction temperature for from about 1 to about 16 hours or longer. The adduct composition is allowed to cool and is suitable for immediate use in foam preparation. Alternatively, the adduct may be stored prior to use and will remain stable indefinitely.

Another method by which my polyol adduct composition may be prepared involves combining the anhydride of the polyol or polyol blend in a vessel, together with a catalyst if desired, and heating the mixture directly to between about 200 and 350° F. This temperature is maintained for about one hour. The resulting adduct is allowed to cool and is then ready for use.

Other methods of preparation will be obvious to one skilled in the art, and the examples given above, as well as those which come below, are illustrative only and are not intended to limit the scope of my invention.

EXAMPLE I 1,000 grams of Selectrofoam 6402, a propylene oxide adduct of sucrose manufactured by Pittsburgh Plate Glass and having an equivalent weight of 125 and a hydroxyl number of 450 was slurried with 500 grams of tetrabromophthalic anhydride and 1.5 grams triethylamine in a flask fitted with a stirrer and $N_2$ purging until sign of reaction occurred. A color change at 212° F. indicated a reaction was taking place. Temperature was maintained at 218° F.+6° F. for 16 hours. The product was a viscous black liquid with no solid present.

EXAMPLE II

Adducts were prepared by reacting 100 grams of PEP-450, a propoxylated pentaerythritol polyol manufactured by Wyandotte and having an equivalent weight of 100, a functionality (functional groups per molecule) of 4, and a hydroxyl number of 561, with varying amounts of tetrachlorophthalic anhydride. The mixture of the two components was heated to 300–350° F., held at that temperature for 1 hour and then allowed to cool. The products were viscous liquids.

EXAMPLE III 1,000 grams of Selectrofoam 6402, identified in Example I, was charged with 500 grams tetrabromophthalic anhydride to a 300 ml. flask. The flask was equipped with a stirrer, thermometer, drying tube, and $N_2$ purge. The mixture was heated until sign of reaction, about 276° F., and held at this temperature for 1 hour, then allowed to cool. The product was a viscous black liquid.

EXAMPLE IV 180 pounds of RS–530, a propoxylated sucrose manufactured by Dow, having an equivalent weight of 106, a functionality of 8 and a hydroxyl number of 530, was charged into a 200 gallon stainless steel kettle together with 420 pounds of a poly(ethyleneglycol) having an average molecular weight of about 200, 300 pounds of tetrabromophthalic anhydride and 3 pounds of triethylamine. The solution was held at a temperature of 180° F. for 20 hours under an $N_2$ pressure of 10 p.s.i.g. The product was a clear amber liquid.

EXAMPLE V

Three parts of RS–530 identified in Example IV and 7 parts of tetraethyleneglycol were slurried with five parts of tetrabromophthalic anhydride and 0.015 part of triethylamine in a flask fiitted with a stirrer and $N_2$ purging until sign of reaction occurred. A color change at 212° F. indicated a reaction was taking place. Temperature was maintained at 218±6° F. for 16 hours. The product was a viscous liquid with no solid present.

EXAMPLE VI 600 grams of RS–530 identified in Example IV was combined with 400 grams of tetraethyleneglycol, 500 grams of tetrabromophthalic anhydride and 5 grams of triethylamine. This solution was heated to a maximum temperature of 200° F. and held for about 5 hours when the reaction appeared completed. The product was a viscous amber liquid.

EXAMPLE VII 476 pounds of PEP–450, identified in Example II, 238 pounds of tetrabromophthalic anhydride, and 2.38 pounds triethylamine were combined in a stainless steel pot and heated under an $N_2$ pressure of 10 p.s.i.g. for 5 hours at 180° F. The product was a uniform viscous liquid.

EXAMPLE VIII 300 grams of RS–530, identified in Example IV were slurried with 700 grams of a poly(ethyleneglycol) having an average molecular weight of about 200, 400 grams of chlorendic anhydride and 4 grams of triethylamine. The solution was heated to a maximum temperature of 200° F. until the reaction appeared complete. The product was a viscous liquid.

Foams may be conveniently prepared from the polyol compositions of this invention according to various methods known to the art. For example, in the so-called "one shot" method the adduct polyol, polyisocyanate, and aromatic carboxylic acid derivative, if any, are combined simultaneously, together with any catalyst or blowing agents, to produce the foam. According to the foam precursor method, the adduct polyol is combined with a non-polymeric foam precursor comprising a mixture of the polyisocyanate and a derivative of an aromatic carboxylic acid. Another method involves pre-reacting, to a limited extent, the polyol and polyisocyanate constituents to form a prepolymer. When foaming is desired, water is added to the prepolymer and the reaction is allowed to go to completion.

As an example of the utility of this invention, a foam composition was prepared from the adduct polyol of Example IV. The foam was prepared by combining 10 parts by weight of a polymethylenepolyphenylisocyanate having a functionality of 2.7 and an equivalent weight of 132, 6.6 parts by weight of the adduct polyol, 5.5 parts by weight of trimellitic anhydride, 0.2 part by weight of a siloxane glycol block copolymer surfactant, 2.5 parts by weight trichlorofluoromethane blowing agents, and 0.1 part by weight dibutyltin diacetate catalyst. Upon combination of all the ingredients a foam began to form. The foam composition produced, although containing no fire retardant additives and although receiving no post formation heat treatment, met all currently established criteria for commercial applications of fire-resistant foams.

Having described my invention, I claim:

1. A carboxy-bearing adduct polyol composition prepared by a process comprising: (1) reacting from about 95 to about 60 parts by weight of a polyol or polyol mixture selected from the group consisting of sorbitol polyols, methylglucoside polyol, sucrose polyol, trimethylol propane polyol and pentaerythritol polyol at a temperature of about 150° F. to 350° F. with (2) from about 5 to about 40 weight percent of tetrabromophthalic anhydride.

2. The composition of claim 1 wherein the adduction reaction is catalyzed with from about 0.05 to about 0.5 weight percent of triethylamine.

3. A carboxy-bearing adduct polyol composition prepared by the process comprising: (1) reacting at a temperature of about 150° F. to 350° F. from about 95 to about 60 parts by weight of a polyol or polyol mixture which polyol or polyol mixture is comprised of from about 90 to about 10 weight percent of a poly(ethyleneglycol) and from about 10 to about 90 weight percent of a polyether polyol selected from the group consisting of sorbitol polyol and sucrose polyol with (2) from about 5 to about 40 weight percent of tetrabromophthalic anhydride.

4. The composition of claim 3 wherein (1) the poly(ethylene-glycol) is tetraethyleneglycol, (2) the polyether polyol is sucrose polyol and (3) the anhydride is tetrabromophthalic anhydride.

5. The composition of claim 3 wherein (A) the polyol comprises a mixture of (1) from about 75 to about 35 weight percent of tetraethylene glycol and (2) from about 25 to about 65 weight percent of sucrose polyol.

References Cited

UNITED STATES PATENTS

| | | | |
|---|---|---|---|
| 3,055,850 | 9/1962 | Worsley | 260—75 TNK |
| 3,058,925 | 10/1962 | Robitschek | 260—75 |
| 3,072,582 | 1/1963 | Frost | 260—2.5 |
| 3,079,350 | 2/1963 | Bernstein | 260—75 |
| 3,275,678 | 9/1966 | Bernstein et al. | 260—75 |
| 3,305,535 | 2/1967 | Merten et al. | 260—2.5 |
| 3,380,967 | 4/1968 | Lowe et al. | 260—2.5 |
| 3,407,150 | 10/1968 | Wismer et al. | 252—182 |
| 3,408,215 | 10/1968 | Wismer et al. | 252—182 |
| 3,433,751 | 3/1969 | Yotsuzuka et al. | 252—182 |
| 3,285,995 | 11/1966 | Nametz et al. | 260—865 |

FOREIGN PATENTS 988,304  4/1965  Great Britain.

OTHER REFERENCES

Nametz: Self-Extinguishing Polyester Resins, Industrial and Engineering Chemistry, vol. 59, No. 5, May 1967, pages 104–109 relied upon.

RICHARD D. LOVERING, Primary Examiner

I. GLUCK, Assistant Examiner

U.S. Cl. X.R.

260—2.5 AP, 2.5 AS, 75 NK, 77.5 AS, DIG 24